US011505161B2

(12) United States Patent
Hassani et al.

(10) Patent No.: US 11,505,161 B2
(45) Date of Patent: Nov. 22, 2022

(54) AUTHENTICATING PRIVILEGE ELEVATION ON A TRANSPORTATION SERVICE

(71) Applicant: Ford Global Technologies, LLC, Dearborn, MI (US)

(72) Inventors: Ali Hassani, Ann Arbor, MI (US); Hamid M. Golgiri, Livonia, MI (US); Cameron Smyth, Wyandotte, MI (US); Vivekanandh Elangovan, Canton, MI (US); John Robert Van Wiemeersch, Novi, MI (US); Alyssa Hauler, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/068,910

(22) Filed: Oct. 13, 2020

(65) Prior Publication Data

US 2022/0111820 A1    Apr. 14, 2022

(51) Int. Cl.
*H04W 76/10*      (2018.01)
*B60R 25/24*      (2013.01)
*H04W 12/06*      (2021.01)
*H04L 9/32*       (2006.01)

(52) U.S. Cl.
CPC .......... *B60R 25/241* (2013.01); *H04L 9/3213* (2013.01); *H04W 12/06* (2013.01); *H04W 76/10* (2018.02); *B60R 2325/101* (2013.01); *B60R 2325/103* (2013.01); *B60R 2325/106* (2013.01); *B60R 2325/108* (2013.01); *B60R 2325/205* (2013.01)

(58) Field of Classification Search
None
See application file for complete search history.

(56) References Cited

U.S. PATENT DOCUMENTS

| | | | |
|---|---|---|---|
| 9,499,129 | B1 | 11/2016 | Penilla et al. |
| 9,766,625 | B2 | 9/2017 | Boroditsky et al. |
| 10,298,578 | B2 * | 5/2019 | Yajima ................ H04L 63/0876 |
| 10,442,399 | B2 * | 10/2019 | Penilla .................... G06Q 10/20 |
| 10,829,088 | B2 * | 11/2020 | Jarvis ...................... G06F 21/31 |
| 11,055,802 | B2 * | 7/2021 | Jarvis ................. G06Q 20/3274 |
| 2013/0317693 | A1 * | 11/2013 | Jefferies ............. G07C 9/00571 701/31.5 |
| 2019/0064803 | A1 | 2/2019 | Frazzoli et al. |

* cited by examiner

*Primary Examiner* — K. Wong
(74) *Attorney, Agent, or Firm* — Brandon Hicks; Eversheds Sutherland (US) LLP

(57) ABSTRACT

The present disclosure is directed to an automotive computer in communication with a mobile device using an authentication manager to increase and/or reduce user privileges that determine a level of vehicle control or feature access that is granted to the user. The authentication manager may increase or decrease the user privilege to standard rider status until the authentication manager has confirmed elevated status for that user via a cloud security challenge question or via a local identification method such as using the mobile device authentication features. This process may be additionally triggered based on environmental or context-based use cases, such as a high traffic condition, local cyber-attack, or transportation of sensitive goods. The system may utilize the authentication to perform out of band pairing of the mobile device and the vehicle, which may add additional security.

21 Claims, 3 Drawing Sheets

AUTHENTICATING PRIVILEGE ELEVATION ON A TRANSPORTATION SERVICE

TECHNICAL FIELD

The present disclosure relates to user authentication, and more particularly, to controlling privilege levels for a mobile device connecting with an automotive computer.

BACKGROUND

It can be challenging to make seamless data connections wirelessly between mobile devices and autonomous vehicles using current mobile device authentication methods. Non-encrypted or unbonded wireless mobile device connections between a vehicle and a mobile device can create security vulnerabilities. The lack of bonding may increase vulnerability to relay attack. Relay attacks involve the interception of information with fraudulent intent as to their future use. For example, radio signals or authentication messages between two devices (or people) may be obtained, manipulated, or spoofed. In other aspects, an eavesdropping attacker may attempt to locate, intercept, and store a signal directly from a single device, e.g. a vehicle key fob, which constantly emits radio signals to check for the proximity of its owner's vehicle. A criminal may send a signal to a victim's device in order to trick it into sending a response that they can then use to authenticate another device or application.

In some vehicle communication systems, in order to make the mobile device authentication process seamless, the connection between the user mobile device and the vehicle does not maintain bonding subsequent to the initial data connection. This lack of bonding no longer requires the user to undertake any interaction with the vehicle after the initial ride hail to connect (i.e. mobile device can be in pocket). While the communication itself may be encrypted by other means, there exists a possibility of risk from a relay attack or other hacking attempt because the lack of continuous bonding can make radio frequency (RF) or light signal channel hopping predictable. Secondary confirmation factors may make unbonded communication channels less vulnerable to relay and other wireless attacks.

US20190064803 (hereafter "the '803 publication"), assigned to Nutonomy, Inc., discloses a vehicle with a mixed-mode controller that evaluates if an occupant has special permission to override a driving mode or request manual driving mode. The vehicle may enter manual mode if the occupants successfully authenticate themselves and enter the vehicle. Conventional vehicle authentication systems, such as the system described in the '803 publication, may not include secondary confirmation factors that may be selectively or automatically triggered based on predefined risk factors.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
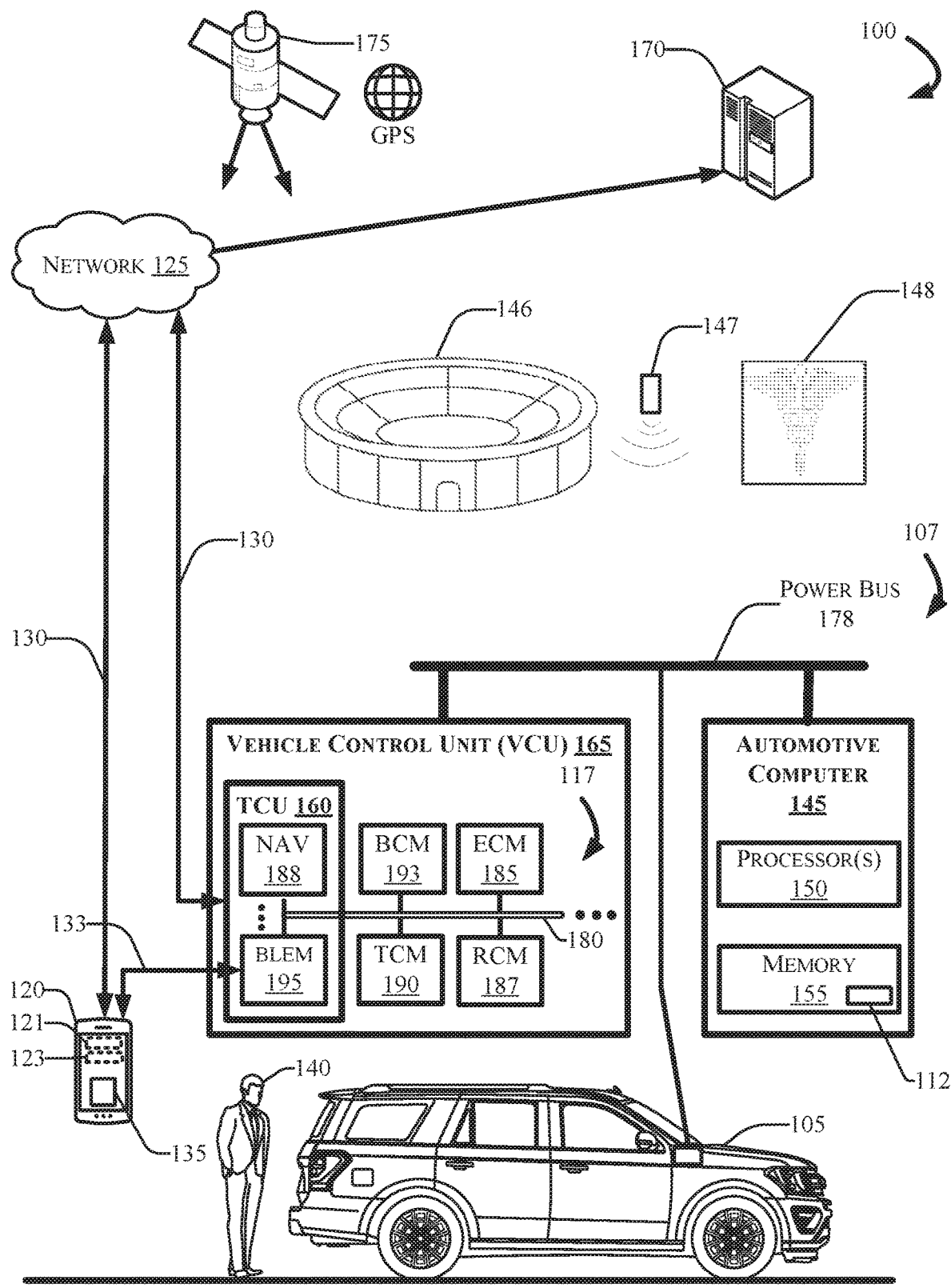
FIG. 1 depicts an example computing environment in which techniques and structures for providing the systems and methods disclosed herein may be implemented.

The disclosure is directed to systems and methods for managing user privilege elevation on a vehicle, such as autonomous vehicle (AV) ride hailing, where the privilege elevation system grants a user an elevated authorization level for vehicle access or control. Aspects of the present disclosure may address the challenge of having seamless connection on an AV while allowing service technicians to authenticate via their mobile device. Using conventional systems, the lack of bonding inherently increases vulnerability to relay attack, thus the present disclosure utilizes a secondary confirmation factor for elevating privileges.

In one example embodiment, an authorization manager disposed onboard a vehicle manages user privileges by increasing or decreasing user access privileges based on risk factors present or reported from a centralized cloud server. User privileges can determine aspects of vehicle control that may be accessed or changed by a user. A respectively low level of user privileges may restrict all user interaction between the user and the vehicle control functions. A respectively high level of user privileges can allow the user to manually control the vehicle and set and change destinations (when the vehicle is configured as an autonomous vehicle (AV), for example). Other examples of various levels of user privilege are possible and contemplated.

In an embodiment, the authentication manager may reduce user privileges to standard rider status until the authentication manager has confirmed an elevated status for that user, which may be accomplished in a number of ways, including via a cloud security challenge question or via a local identification method such as using the mobile device authentication features. In another aspect, the privilege elevation system may utilize the authentication to perform out of band pairing of the mobile device and the vehicle, which may add additional security. This process may be additionally triggered based on environmental or context-based use cases, such as a high traffic condition, a local cyber-attack, or transportation of sensitive goods by the user.

The systems and methods disclosed herein can include a second authentication method when a mobile device requests an elevated privilege mode with a vehicle. The secondary authentication method may include connecting the mobile device with the authentication manager associated with the vehicle computing system to confirm that a user privilege level is associated with the requesting mobile device. The privilege elevation system determines if the communication channel has been correctly authenticated, and then sends a receipt message to the authentication manager. The authentication manager can grant access to the mobile device and elevate the user from a standard privilege level to an elevated privilege level with the vehicle.

In disclosed embodiments, the authentication manager may selectively use cloud-based authentication methods or local authentication methods. Cloud-based methods can include dynamic token verification, cellular, Wi-Fi, Direct Short Range Control (DSRC), and local authentication methods may include Near Field Communication (NFC) challenges, selective Bluetooth® Low Energy (BLE) bonding, Ultra-Wideband (UWB), Li-Fi, sound communication, and remote keyless entry. Dynamic token verification may involve a dynamic access token being delivered to the authentication manager as well as the user's mobile device. When the mobile device connects to the vehicle, the authentication manager may receive a prompt to input the token. The token may also be built into Consumer Access Key (CAK) meta-data.

In one embodiment, an NFC challenge may also utilize a token or encryption key, where the vehicle computing system reads the key using an NFC reader in the vehicle.

In another embodiment, selective BLE bonding may be utilized for elevated privilege users, where standard privilege users are prevented from higher level privileged access to vehicle controls.

In another example embodiment, the privilege elevation system uses local authentication using the requesting mobile device, which can include user identification verification such as a password, biometric, or a user presence tap on the mobile device input screen, where the user taps an acknowledgement that they are at the vehicle.

Embodiments of the present disclosure may substantially mitigate security attacks to vehicle systems from unauthorized intruders while preserving a seamless and positive user experience that makes unbonded communication between the mobile device and the vehicle secure and user-friendly. These and other advantages of the present disclosure are provided in greater detail herein.

Illustrative Embodiments

The disclosure will be described more fully hereinafter with reference to the accompanying drawings, in which exemplary embodiments of the disclosure are shown, and not intended to be limiting.

FIG. 1 depicts an example computing environment 100 that can include a vehicle 105 comprising an automotive computer 145, and a Vehicle Controls Unit (VCU) 165 that typically includes a plurality of electronic control units (ECUs) 117 disposed in communication with the automotive computer 145. A mobile device 120, which may be associated with a user 140 and the vehicle 105, may connect with the automotive computer 145 using wired and/or wireless communication protocols and transceivers. The mobile device 120 may be communicatively coupled with the vehicle 105 via one or more network(s) 125, which may communicate via one or more wireless channel(s) 130, and/or may connect with the vehicle 105 directly using near field communication (NFC) protocols, Bluetooth® protocols, Wi-Fi, Li-Fi, Sound, Ultra-Wide Band (UWB), and other possible data connection and sharing techniques. The vehicle 105 may also receive and/or be in communication with a Global Positioning System (GPS) 175 and the vehicle 105 may also use dead reckoning to compliment navigation when the GPS system is not available.

The automotive computer 145 may be or include an electronic vehicle controller, having one or more processor(s) 150 and memory 155. The automotive computer 145 may, in some example embodiments, be disposed in communication with the mobile device 120, and one or more server(s) 170. The server(s) 170 may be part of a cloud-based computing infrastructure and may be associated with and/or include a Telematics Service Delivery Network (SDN) that provides digital data services to the vehicle 105 and other vehicles (not shown in FIG. 1) that may be part of a vehicle fleet.

Although illustrated as a sport utility, the vehicle 105 may take the form of another passenger or commercial automobile such as, for example, a car, a truck, a sport utility, a crossover vehicle, a van, a minivan, a taxi, a bus, etc., and may be configured to include various types of automotive drive systems. Exemplary drive systems can include various types of internal combustion engine (ICE) powertrains having a gasoline, diesel, or natural gas-powered combustion engine with conventional drive components such as, a transmission, a drive shaft, a differential, etc. In another configuration, the vehicle 105 may be configured as an electric vehicle (EV). More particularly, the vehicle 105 may include a battery EV (BEV) drive system or be configured as a hybrid EV (HEV) having an independent onboard powerplant, a plug-in HEV (PHEV) that includes a HEV powertrain connectable to an external power source and including a parallel or series hybrid powertrain having a combustion engine powerplant and one or more EV drive systems. HEVs can include battery and/or supercapacitor banks for power storage, flywheel power storage systems, or other power generation and storage infrastructure. The vehicle 105 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, the vehicle 105 may be a manually driven vehicle, and/or be configured to operate in a fully autonomous (e.g., driverless) mode (e.g., level-5 autonomy) or in one or more partial autonomy modes. Examples of partial autonomy modes are widely understood in the art as autonomy Levels 1 through 5. An autonomous vehicle (AV) having Level-1 autonomy may generally include a single automated driver assistance feature, such as steering or acceleration assistance. Adaptive cruise control is one such example of a Level-1 autonomous system that includes aspects of both acceleration and steering. Level-2 autonomy in vehicles may provide partial automation of steering and acceleration functionality, where the automated system(s) are supervised by a human driver that performs non-automated operations such as braking and other controls. Level-3 autonomy in a vehicle can generally provide conditional automation and control of driving features. For example, Level-3 vehicle autonomy typically includes "environmental detection" capabilities, where the vehicle can make informed decisions independently from a present driver, such as accelerating past a slow-moving vehicle, while the present driver remains ready to retake control of the vehicle if the system is unable to execute the task. Level-4 autonomy includes vehicles having high levels of autonomy that can operate independently from a human driver, but still include human controls for override operation. Level-4 automation may also enable a self-driving mode to intervene responsive to a predefined conditional trigger, such as a road hazard or a system failure. Level-5 autonomy is associated with autonomous vehicle systems that require no human input for operation, and generally do not include human operational driving controls.

According to embodiments of the present disclosure, the privilege elevation system 107 may be configured to operate with a vehicle having any level of autonomous vehicle controller, or in some embodiments, having no autonomous controller. An example AV controller 200 is described in greater detail with respect to FIG. 2. Accordingly, the privilege elevation system 107 may provide some aspects of human control to the vehicle 105, when the vehicle is configured as an AV.

The mobile device 120 generally includes a memory 123 for storing program instructions associated with an application 135 that, when executed by a mobile device processor 121, performs aspects of the disclosed embodiments. The application (or "app") 135 may be part of the privilege elevation system 107 or may provide information to the privilege elevation system 107 and/or receive information from the privilege elevation system 107.

As noted above, one example use case for the privilege elevation system 107 is for service technicians to confirm and authenticate their presence for activities such as AV manual driving such that the technician may manually control the vehicle while performing maintenance operations. In other aspects, an elevated privilege level may be desired for situations that present a relatively higher risk for security. Examples of elevated risk situations may include crowded public areas (such as a sporting arena 146), where the relative attack probability (and therefore, potential risk) may be elevated due to a large number of people located in close proximity. Other examples of an elevated risk can include known gatherings that include a higher density of hackers (such as DEFCON), or the vehicle proximity to a major security breach (depicted as a security breach 147). Additional security may also be required when transporting people with sensitive information (such as governmental officials), and/or loading/unloading particularly valuable goods (depicted as valuable medical supplies 148). Other triggers are possible and contemplated. Triggers for elevated privilege may be determined in advance, which are referred to hereafter as an elevated privilege trip. In other aspects, the heightened privilege may be triggered based on commands from a centralized controller, such as the server(s) 170 operating as one or more cloud servers.

In some aspects, the mobile device 120 may communicate with the vehicle 105 through the one or more channel(s) 130, which may be bonded or unbonded wireless connections that are established between the mobile device 120 and a Telematics Control Unit (TCU) 160 disposed onboard the vehicle 105. The mobile device 120 may communicate with the TCU 160 using a wireless transmitter (not shown in FIG. 1) associated with the TCU 160 on the vehicle 105. The transmitter may communicate with the mobile device 120 using a wireless communication network such as, for example, the one or more network(s) 125. The wireless channel(s) 130 are depicted in FIG. 1 as communicating via the one or more network(s) 125, and via one or more direct wireless connection(s) 133. The wireless connection(s) 133 may include various low-energy protocols including, for example, Bluetooth®, BLE, peer-to-peer UWB, or other Near Field Communication (NFC) protocols. According to embodiments of the present disclosure, a secondary key code may be delivered to and from the vehicle 105 with a Consumer Access Key (CAK) using the wireless connection(s) 133, and via the wireless connection(s) 130.

The network(s) 125 illustrate an example of an example communication infrastructure in which the connected devices discussed in various embodiments of this disclosure may communicate. The network(s) 125 may be and/or include the Internet, a private network, public network or other configuration that operates using any one or more known communication protocols such as, for example, transmission control protocol/Internet protocol (TCP/IP), Bluetooth®, Wi-Fi based on the Institute of Electrical and Electronics Engineers (IEEE) standard 802.11, Ultra-Wide Band (UWB), and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The automotive computer 145 may be installed in an engine compartment of the vehicle 105 (or elsewhere in the vehicle 105) and may be configured to operate as a functional part of the privilege elevation system 107, in accordance with the disclosure. The automotive computer 145 may include one or more processor(s) 150 and a computer-readable memory 155.

The one or more processor(s) 150 may be disposed in communication with one or more memory devices disposed in communication with the respective computing systems (e.g., the memory 155 and/or one or more external databases not shown in FIG. 1). The processor(s) 150 may utilize the memory 155 to store programs in code and/or to store data for performing aspects in accordance with the disclosure. The memory 155 may be a non-transitory computer-readable memory storing program code for implementing an authentication manager 112. The memory 155 can include any one or a combination of volatile memory elements (e.g., dynamic random-access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.).

The VCU 165 may coordinate the data such as CAK metadata and other types of data shared between vehicle 105 systems, connected servers (e.g., the server(s) 170), and other vehicles (not shown in FIG. 1) operating as part of a vehicle fleet. The VCU 165 can include or communicate with any combination of the ECUs 117, such as, for example, a Body Control Module (BCM) 193, an Engine Control Module (ECM) 185, a Transmission Control Module (TCM) 190, the TCU 160, a Restraint Control Module (RCM) 187, etc. In some aspects, the VCU 165 may control aspects of the vehicle 105, and implement one or more instruction sets received from the application 135 operating on the mobile device 120, from one or more instruction sets received from the privilege elevation system 107, and/or from instructions received from an AV controller, such as an AV controller 200 discussed with respect to FIG. 2.

The TCU 160 can be configured to provide vehicle connectivity to wireless computing systems onboard and offboard the vehicle 105, and may include a Navigation (NAV) receiver 188 for receiving and processing a GPS signal from the GPS satellites 175, a Bluetooth® Low-Energy (BLE) 195, a Wi-Fi transceiver, an Ultra-Wide Band (UWB) transceiver, and/or other wireless transceivers (not shown in FIG. 1) that may be configurable for wireless communication between the vehicle 105 and other systems, computers, and modules. The TCU 160 may include independent modules, and/or include one or more control units. The TCU 160 may be disposed in communication with the ECUs 117 by way of a bus 180. In some aspects, the TCU 160 may retrieve data and send data as a node in a CAN bus.

The BLEM 195 may establish wireless communication using Bluetooth® and Bluetooth Low-Energy® communication protocols by broadcasting and/or listening for broadcasts of small advertising packets and establishing connections with responsive devices that are configured according to embodiments described herein. For example, the BLEM 195 may include Generic Attribute Profile (GATT) device connectivity for client devices that respond to or initiate GATT commands and requests, and connect directly with the mobile device 120, and/or one or more keys.

The bus 180 may be configured as a Controller Area Network (CAN) bus organized with a multi-master serial bus standard for connecting two or more of the ECUs 117 as nodes using a message-based protocol that can be configured and/or programmed to allow the ECUs 117 to communicate with each other. The bus 180 may be or include a high speed CAN (which may have bit speeds up to 1 Mb/s on CAN, 2-12 Mb/s on CAN Flexible Data Rate (CAN FD)), and can include a low-speed or fault tolerant CAN (up to 125 Kbps), which may, in some configurations, use a linear bus configuration. In some aspects, the ECUs 117 may communicate with a host computer (e.g., the automotive computer 145, the privilege elevation system 107, and/or the server(s) 170, etc.), and may also communicate with one another without the necessity of a host computer. The bus 180 may connect the ECUs 117 with the automotive computer 145 such that the automotive computer 145 may retrieve information from, send information to, and otherwise interact with the ECUs 117 to perform steps described according to embodiments of the present disclosure. The bus 180 may connect CAN bus nodes (e.g., the ECUs 117) to each other through a two-wire bus, which may be a twisted pair having a nominal characteristic impedance. The bus 180 may also be accomplished using other communication protocol solutions, such as Media Oriented Systems Transport (MOST) or Ethernet. In other aspects, the bus 180 may be a wireless intra-vehicle bus.

The VCU 165 may control various loads directly via the bus 180 communication or implement such control in conjunction with the BCM 193. The ECUs 117 described with respect to the VCU 165 are provided for exemplary purposes only and are not intended to be limiting or exclusive. Control and/or communication with other control modules not shown in FIG. 1 is possible, and such control is contemplated.

In an example embodiment, the ECUs 117 may control aspects of vehicle operation and communication using inputs from human drivers, inputs from an autonomous vehicle controller, the privilege elevation system 107, and/or via wireless signal inputs received via the wireless connection(s) 133 from other connected devices such as the mobile device 120, among others. The ECUs 117, when configured as nodes in the bus 180, may each include a central processing unit (CPU), a CAN controller, and/or a transceiver (not shown in FIG. 1). For example, although the mobile device 120 is depicted in FIG. 1 as connecting to the vehicle 105 via the BLEM 195, it is possible and contemplated that the wireless connection 133 may also or alternatively be established between the mobile device 120 and one or more of the ECUs 117 via the respective transceiver(s) associated with the module(s).

The BCM 193 generally includes integration of sensors, vehicle performance indicators, and variable reactors associated with vehicle systems, and may include processor-based power distribution circuitry that can control functions associated with the vehicle body such as lights, windows, security, door locks and access control, and various comfort controls. The central BCM 193 may also operate as a gateway for bus and network interfaces to interact with remote ECUs (not shown in FIG. 1).

The BCM 193 may coordinate any one or more functions from a wide range of vehicle functionality, including the privilege elevation system 107, energy management systems, alarms, vehicle immobilizers, driver and rider access authorization systems, Mobile device-as-a-Key (PaaK) systems, driver assistance systems, AV control systems, power windows, doors, actuators, and other functionality, etc. The BCM 193 may be configured for vehicle energy management, exterior lighting control, wiper functionality, power window and door functionality, heating ventilation and air conditioning systems, and driver integration systems. In other aspects, the BCM 193 may control auxiliary equipment functionality, and/or be responsible for integration of such functionality. In one aspect, a vehicle having a trailer control system may integrate the system using, at least in part, the BCM 193.

The computing system architecture of the automotive computer 145, VCU 165, and/or the privilege elevation system 107 may omit certain computing modules. It should be readily understood that the computing environment depicted in FIG. 1 is one example of a possible implementation according to the present disclosure, and thus, it should not be considered limiting or exclusive.

After the above introduction to an example vehicle architecture for the vehicle 105, an example method will be described in which the privilege elevation system 107 increases the privilege level for a user, such as, for example, a technician performing maintenance or another task on the vehicle 105. In the case where the vehicle 105 is configured as an AV, the technician may desire to disengage the automatic driving features and operate the vehicle 105 manually, which is described hereafter as an elevated privilege trip.

In some aspects, when an elevated privilege trip is scheduled, the server(s) 170 may send the vehicle a mission payload that includes a requirement for a secondary factor challenge. This may be handled in various ways. In one aspect, the secondary factor challenge may include a location requirement. For example, in one aspect, the mobile device 120 may be localized within the vehicle 105, provide GPS coordinates to the server(s) 170 when the mobile device 120 is within a target radius of vehicle 105, or when the mobile device user (e.g., the user 140) performs an NFC tap with a vehicle reader (not shown in FIG. 1). The secondary confirmation of the NFC tap may trigger the privilege elevation system 107 to deploy the secondary factor challenge. Additionally, the mobile device 120 may perform an out of band pairing procedure after responding to the secondary factor challenge to engage a bonded session.

When the trip is scheduled, the server(s) 170 may transmit a dynamic access token to both the authentication manager and technician's mobile application 135 disposed on the mobile device 120. An example dynamic token can include, for example, an RSA token. When the mobile device 120 connects to the vehicle 105, the mobile device 120 may generate a user prompt to input an authentication token associated with the user 140. Responsive to receiving the authentication token, the mobile device 120 may transmit the token to the authentication manager 112 via BLE, NFC, or another protocol for authentication. If the privilege elevation system 107 determines that the token is valid, the authentication manager 112 may inform the mobile device 120 (and thus the user 140) of their elevated privilege status via a confirmation message.

The token may also be built into to the CAK meta-data to support scenarios where connectivity is not guaranteed. For example, a 7-digit challenge code could be stored in association with both CAKs (onboard the mobile device 120 and the vehicle 105) such that both the mobile device and the vehicle have sufficient verification information once BLE connectivity has begun.

Alternatively, an NFC reader (not shown in FIG. 1) may be disposed on the vehicle 105 interior for the service technician to do their elevation verification. Similar to the process above, the server(s) 170 may transmit a token or encryption key at mission delivery to the vehicle and mobile device. When the mobile device 120 is connected to the vehicle 105, the privilege elevation system 107 may generate a prompt (e.g., via the mobile device 120 and/or a vehicle infotainment system disposed onboard the vehicle 105) to place their mobile device proximate to the appropriate reader such that the challenge may take place. If valid, the authentication manager 112 may inform the authorization manager of the user's elevated status.

In another aspect, the technician may unlock the vehicle using RKE (Remote and Keyless Entry) functionality, which may be installed on the mobile device 120, a vehicle keypad or via key fob (keypad and fob not shown in FIG. 1). In the former case, while the technician performs the RKE using BLE with the mobile device 120, the mobile device 120 may also transmit the message to the vehicle 105 via the cloud (e.g., the server(s) 170 using the network(s) 125) via the TCU 160. If the mobile device 120 transmits both messages, and the server(s) 170 confirm that both messages are received by the vehicle 105 within a predetermined timeframe (e.g., 2 seconds, 5 seconds, 20 seconds, etc.), then the privilege elevation system 107 may authenticate the user as a valid user in view of the double authentication from the user 140. The above method can be done over seamless connectivity or over bonding for BLE or other wireless based RKE functionality where the latter provides additional security for BLE based RKE function.

In another embodiment, confirming the presence of the operator at their mobile device may serve as sufficient authentication. For example, the mobile device 120 may authenticate the user 140 using a PIN code, a biometric scanner, voice recognition, or via another method, and inform the authentication manager 112 of the authenticated user. A simplified authentication protocol may further include prompting the user 140, via the mobile device 120, to tap an acknowledgement that the user is at the vehicle once the mobile device is localized within the vehicle 105. The mobile device 120 may transmit a token (not shown in FIG. 1) to the authentication manager 112, which may trigger a privilege elevation associated with the mobile device (and thus the user 140).

Aspects of the present disclosure describe communication channels (e.g., the wireless connection(s) 133) as being bonded or non-bonded channels. Bonding may include link layer encryption methods. In some aspects, two types of encryption are contemplated between connected devices: A first method includes transmission of a Consumer Access Key (CAK), which can be used by the privilege elevation system 107 to encrypt data with a key supplied by the server(s) 170 to the vehicle 105 and the mobile device 120.

A second method can include utilizing the CAK. According to the CAK method, the privilege elevation system 107 may initiate a link layer encryption using the BLE protocol (which can include a private and public key set). The private and public key set may be part of the BLE protocol stack.

Connected states and bonded states generally describe encryption levels for the wireless connection(s) 133, where a connected state has no encryption, and a bonded state, which may be approved by the user 140 prior to establishing a full connection between the mobile device 120 and the vehicle 105 is based on a user-approved bonding. Bonding is a persistent association that can require customer approval via an input indicative that the user 140 approves this bonding. Once the mobile device 120 and the vehicle computing system 145 are bonded, on a subsequent trip after the user 140 approves the bonding, the mobile device 120 and vehicle 105 may establish a bonded session again responsive to a determination by the system 107 that the mobile device 120 and the vehicle 105 are the same respective device and vehicle that established the bonding during a prior bonded session.

Figure 2:
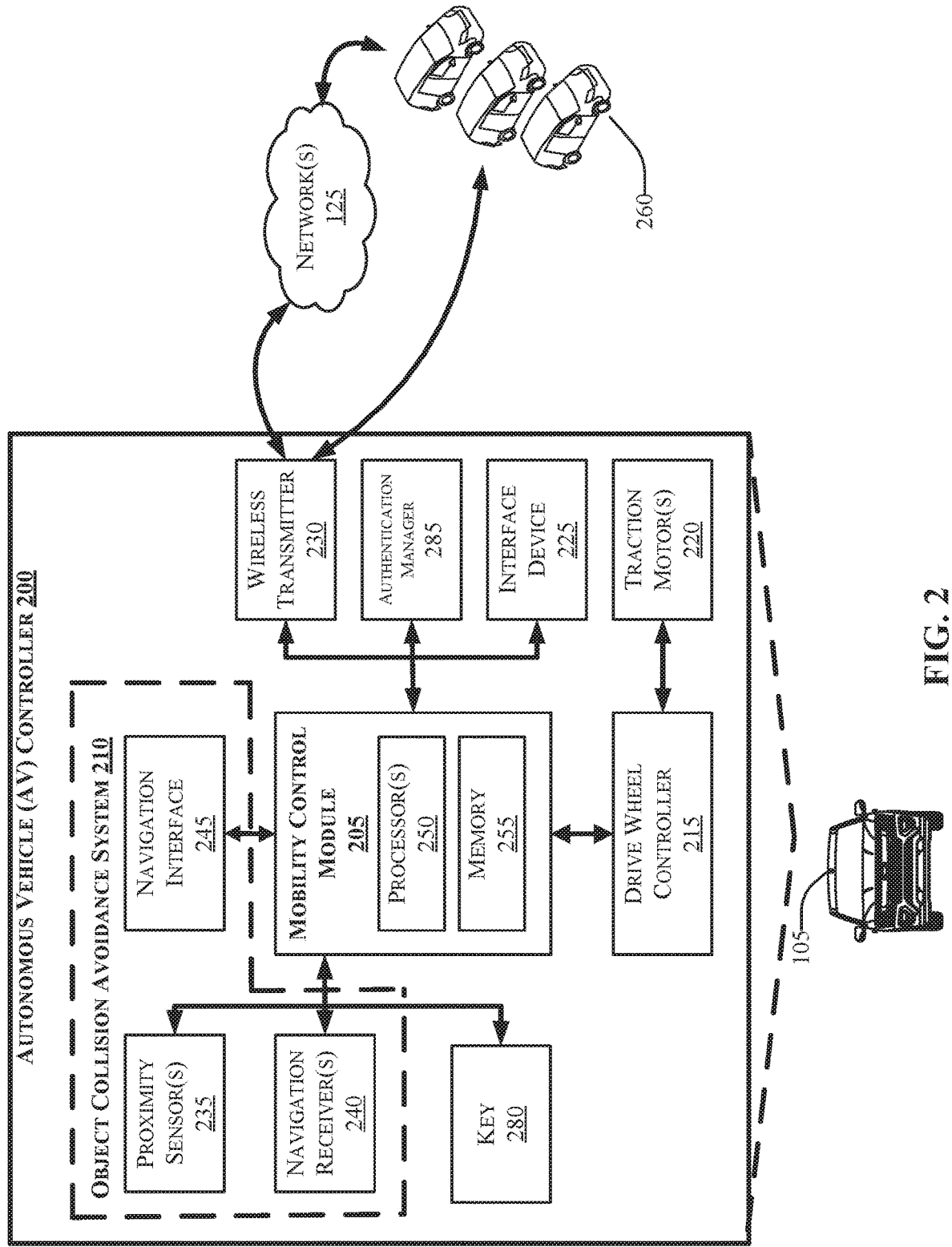
FIG. 2 depicts a block diagram of an example control system for an autonomous vehicle in accordance with the present disclosure.

Aspects of the present disclosure may facilitate interaction processes between a mobile device (e.g., the mobile device 120) and a vehicle equipped with a privilege elevation system, such as the system 107 described herein. As explained with respect to FIG. 1, the vehicle 105 may be an AV, when the vehicle 105 is configured with autonomous driving features. FIG. 2 depicts a block diagram of an example AV controller 200 for an autonomous vehicle. The example AV controller 200 may be configured to receive data from an object collision avoidance system 210. The AV controller 200 can further include a drive wheel controller 215 in communication with the mobility control module 205 and one or more traction motor(s) 220 in communication with the drive wheel controller 215. An interface device 225 may be disposed in communication with the object collision avoidance system 210. The object collision avoidance system 210 may communicate one or more control signals to a mobile device application(s) 135 via the VCU 165 (as shown in FIG. 1), which may be in communication with the mobility control module 205.

The object collision avoidance system 210 may include one or more proximity sensor(s) 235, one or more navigation receiver(s) 240, and a navigation interface 245. The mobility control module 205 may communicate with the drive wheel controller 215 and transmit one or more signals for control of the one or more traction motor(s) 220. In an example embodiment, the mobility control module 205 may further include the key 280, which may be configured to activate an operation of the vehicle 105.

The key may be a physical key or may be an identification code or a password entered by a user via a touch screen interface (e.g., the interface device 225). The identification code may be associated with a service provider who rents vehicle 105, an individual owner of the vehicle 105, and/or a subscriber to multiple vehicles in a fleet 260 associated with the service provider, etc. The identification code may further enable a user to navigate a specific geographic region authorized by the service provider. In other words, in some embodiments, vehicle 105 may be configured to operate within a geofenced area within a specific geographic region, where the specific region is associated with the identification code.

The mobility control module 205 may include one or more processor(s) 250, and a memory 255. The processor(s) 250 may be one or more commercially available general-purpose processor(s), such as a processor from the Intel® or ARM® architecture families. In some aspects, the mobility control module 205 may be implemented in a system on a chip (SoC) configuration, to include other system components such as RAM, flash storage and I/O buses. Alternatively, mobility control module 205 can be implemented using purpose-built integrated circuits, or any other suitable technology now known or later developed. The mobility control module 205 also includes a memory unit.

The memory 255 may include executable instructions implementing the basic functionality of navigation system 103 and a database of locations in geographic area.

The object collision avoidance system 210 may provide route management and communication between one or more other vehicles in a vehicle fleet 260, and to the operator of the vehicle 105. The object collision avoidance system 210 may receive operator input via the navigation interface 245 to receive user selections indicative of ride-hail destinations, for example, while operating the vehicle 105. The mobility control module 205 may receive navigational data from the navigation receiver(s) 240 and the proximity sensor(s) 235, determine a navigational path from a first location to a second location, and provide instructions to the drive wheel controller 215 for autonomous, semi-autonomous, and/or manual operation.

The navigation receiver(s) 240 can include one or more of a global positioning system (GPS) receiver, and/or other related satellite navigation systems such as the global navigation satellite system (GLNSS), Galileo, or other similar systems known in the art of autonomous vehicle operation. Additionally, the navigation receiver(s) 240 can be configured to receive locally based navigation cues to aid in precise navigation through space-restricted areas, such as, for example, in a crowded street, and/or in a distributed beacon environment. Further, the navigation receiver 240 may employ dead reckoning techniques when communication with off-board localization transmitters is not possible. When deployed in conjunction with a distributed beacon network (not shown in FIG. 2), locally based navigation cues can include communication with one or more purpose-built location beacons (not shown in FIG. 2) placed throughout a geographic area. The navigation cues may enable an increased level of navigation precision and provide specific indicators for locations of various points of interest. In other aspects, the navigation receiver(s) 240 may include one or more navigation transceivers (not shown in FIG. 2) for communication with mobile network infrastructure for cell tower triangulation and use of known-location Wi-Fi hotspots. Any location technology now known or later developed that can provide a high precision location (e.g. preferably within a linear foot) can be useful as part of navigation receiver(s) 240.

The proximity sensor(s) 235 may work in connection with the navigation receiver(s) 240 to provide situational awareness to mobility control module 205 for autonomous navigation. For example, the proximity sensors may include one or more Radio Detection and Ranging (RADAR or "radar") sensor configured for detection and localization of objects using radio waves, a Light Detecting and Ranging (LiDAR or "lidar") sensor, a vision sensor system having trajectory, obstacle detection, object classification, augmented reality, and/or other capabilities, and/or the like. The proximity sensor(s) 235 may alert the mobility control module 205 to the presence of sensed obstacles and provide trajectory information to the mobility control module 205, where the trajectory information is indicative of moving objects or people that may interact with the vehicle 105. The trajectory information may include one or more of a relative distance, a trajectory, a speed, a size approximation, a weight approximation, and/or other information that may indicate physical characteristics of a physical object or person. The mobility control module 205 may be configured to aggregate information from navigation receiver(s) 240, such as current position and speed, along with sensed obstacles from the proximity sensor(s) 235 and interpret the aggregated information to compute a safe path towards a destination such that the vehicle 105 avoids collisions. Sensed obstacles can include other vehicles, pedestrians, animals, structures, curbs, and other random objects. In some implementations the proximity sensor(s) 235 may be configured to determine the lateral dimensions of the path upon which the vehicle 105 is traveling, e.g. determining relative distance from the side of a sidewalk or curb, to help aid mobility control module 205 in maintaining precise navigation on a particular path.

The navigation interface 245 allows the operator of the vehicle 105 to provide navigational inputs. For example, where a point of interest is a shopping center, the navigation interface 245 can present information such as various stores and attractions that are located in the shopping center, hours of operation, etc. Similarly, where the point of interest is a recreation center or sports center, navigation interface 245 can present information on upcoming events, ticket availability and prices, and similar data. Such data is typically stored in a database file either located as part of memory in mobility control module 205, or possibly in navigation interface 245, if configured with a separate database.

The interface device 225 may include a touch screen interface surface configured to provide operational information such as power consumption information, battery health, battery level, etc. The other controlling aspects of the autonomous vehicle 105, such as breaking, acceleration, etc., may be in communication with, and/or be integral with, the navigation interface 245 such that they share a common touch screen interface.

The wireless transmitter 230 may communicate with one or more other vehicles in the fleet 260 and/or a central routing computer (e.g., the server(s) 170 as shown in FIG. 1) using a wireless communication network such as, for example, the network(s) 125. The wireless transmitter 230 may embody any known or later protocol, using one or more vehicle-to-vehicle communication protocols. An example of a vehicle-to-vehicle communication protocol may be, for example, the dedicated short-range communication (DSRC) protocol.

The mobility control module 205 may connect with one or more drive wheel controller(s) 215, which in turn may operate one or more traction motor(s) 220. The mobility control module 205 may communicate with the drive wheel controller 215 for providing autonomous and/or semi-autonomous navigation to selected destinations.

The drive wheel controller 215 may control one or more drive mechanisms such as, for example, one or more of a brushless direct current (DC) motor, or another traction motor technology.

Figure 3:
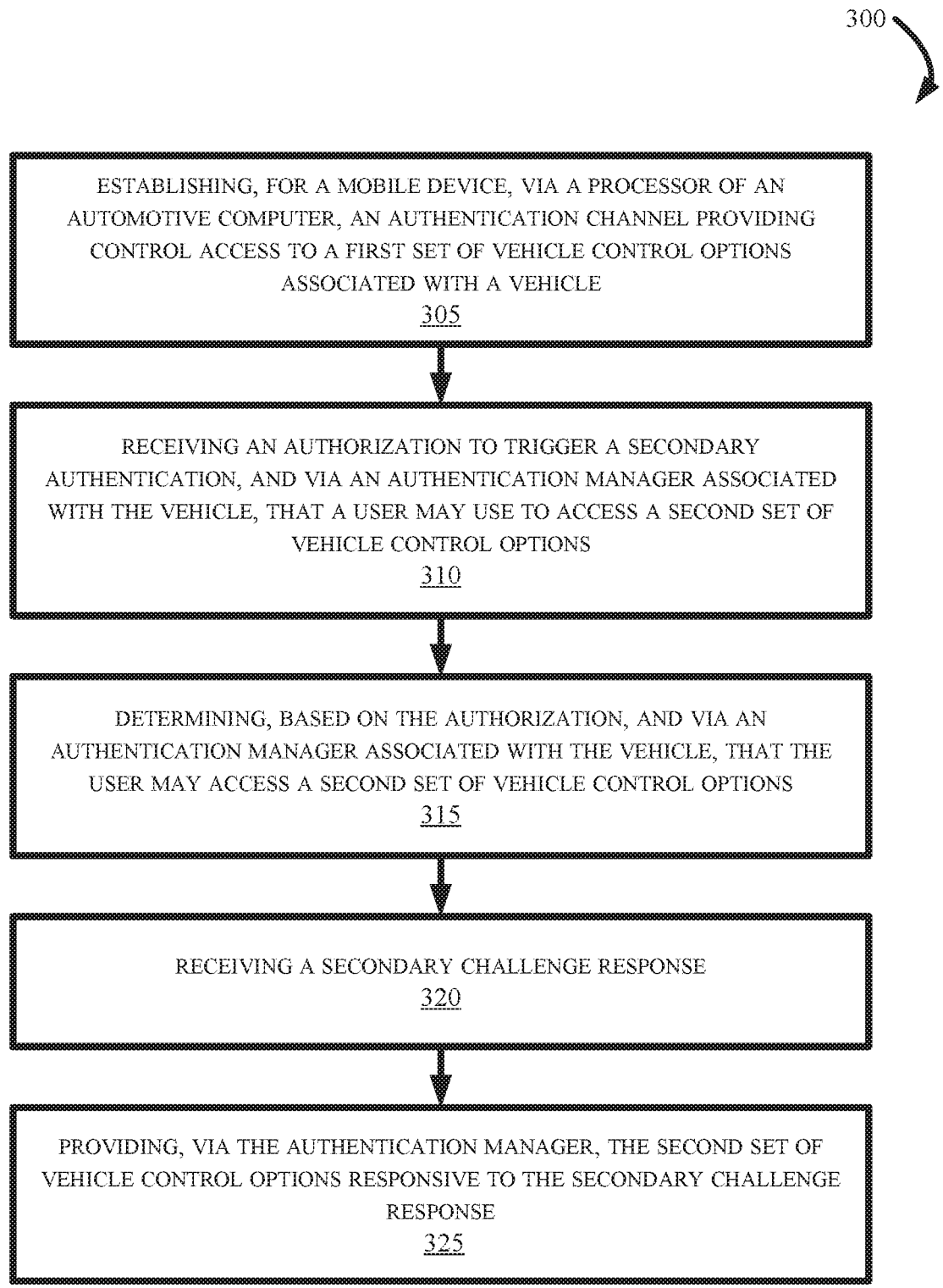
FIG. 3 depicts a flow diagram in accordance with the present disclosure.

FIG. 3 is a flow diagram of an example method 300 for controlling user access to vehicle control options that are associated with user privilege levels, according to the present disclosure. FIG. 3 may be described with continued reference to prior figures, including FIGS. 1 and 2. The following process is exemplary and not confined to the steps described hereafter. Moreover, alternative embodiments may include more or fewer steps than are shown or described herein and may include these steps in a different order than the order described in the following example embodiments.

Referring first to FIG. 3, at step 305, the method 300 may commence with establishing, for a mobile device, via a processor of an automotive computer, an authentication channel providing control access to a first set of vehicle control options associated with a vehicle.

Next, the method includes a step 310 of receiving an authorization to trigger a secondary authentication, and via an authentication manager associated with the vehicle, that a user may use to access a second set of vehicle control options. The authorization to trigger the secondary authentication may be responsive to receiving, from the mobile device, a request message requesting access to the second set of vehicle control options associated with a second level of user authentication. In one aspect, the initial request message requesting access to the first set of vehicle control options may be received via a non-bonded communication channel.

At step 315, the method 300 may further include determining, based on the authorization, and via an authentication manager associated with the vehicle, that the user may access a second set of vehicle control options.

At step 320, the method 300 may include receiving a secondary challenge response.

At step 325, providing, via the authentication manager, the second set of vehicle control options responsive to the secondary challenge response. This step may include confirming that the mobile device is within an operational radius of the automotive computer and determining that the mobile device may access the second set of vehicle control options responsive to determining that the mobile device is within the operational radius.

At step 325, providing the second set of vehicle control options may include sending a request for additional user input to the mobile device, requesting additional user input to authenticate a user identity, and receiving additional input responsive to the request for additional user input. This step may further include determining that the mobile device may access the second set of vehicle control options based on the additional input provided; and receipt of an encrypted token from the mobile device.

In one aspect, the vehicle may receive the additional input from the user via an interface associated with the vehicle. In another aspect, the vehicle receives the additional input from the user via the mobile device. Sending the additional user input may be responsive to a determination that the mobile device is localized within the vehicle.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method for controlling a vehicle, comprising:
    establishing, for a mobile device, via a processor of an automotive computer, an authentication channel providing control access to a first set of vehicle control options associated with the vehicle;
    responsive to authentication of the first set of vehicle control options, receiving an authorization to trigger a secondary authentication, via an authentication manager associated with the vehicle, such that the mobile device may access a second set of vehicle control options;
    receiving a secondary authentication; and
    providing, via the authentication manager, the second set of vehicle control options responsive to the secondary authentication,
    wherein authentication of the first set of vehicle control options comprises determining that the mobile device is associated with a first privilege level associated with the vehicle, and wherein authentication of the second set of vehicle control options comprises determining that the mobile device is associated with a second privilege level associated with the vehicle, wherein the second set of vehicle control options provide different control over the vehicle to the mobile device than the first set of vehicle control options.

2. The method according to claim 1, wherein the authorization to trigger the secondary authentication is responsive to receiving, from the mobile device, a request message requesting access to the second set of vehicle control options associated with a second level of user authentication.

3. The method according to claim 2, further comprising receiving the request message requesting access to the second set of vehicle control options via a non-bonded communication channel.

4. The method according to claim 1, further comprising:
confirming that the mobile device is within an operational radius of the automotive computer, and
determining that the mobile device may access the second set of vehicle control options responsive to determining that the mobile device is within the operational radius.

5. The method according to claim 1, further comprising:
sending a request for additional user input to the mobile device, requesting additional user input to authenticate a user identity;
receiving additional input from the mobile device responsive to the request for additional user input, and determining that the mobile device may access the second set of vehicle control options based on the additional input; and
receiving an access token from the mobile device.

6. The method according to claim 5, wherein the authentication manager receives the additional input from the mobile device via an interface associated with the automotive computer of the vehicle.

7. The method according to claim 6, wherein the vehicle receives the additional input from the mobile device.

8. The method according to claim 7, wherein sending the additional user input is responsive to determining that the mobile device is localized within an operational radius of the automotive computer of the vehicle.

9. A system, comprising:
a processor; and
a memory for storing executable instructions, the processor configured to execute the instructions to:
establish, for a mobile device, an authentication channel providing control access to a first set of vehicle control options associated with a vehicle;
receive an authorization to trigger a secondary authentication, and via an authentication manager associated with the vehicle, that a user may access a second set of vehicle control options;
determine, based on the authorization, via an authentication manager associated with an automotive computer of the vehicle, that the user may access the second set of vehicle control options;
receive a secondary authentication; and
provide, via the authentication manager, the second set of vehicle control options responsive to the secondary authentication,
wherein authentication of the first set of vehicle control options comprises determining that the mobile device is associated with a first privilege level associated with the vehicle, and wherein authentication of the second set of vehicle control options comprises determining that the mobile device is associated with a second privilege level associated with the vehicle, wherein the second set of vehicle control options provide different control over the vehicle to the mobile device than the first set of vehicle control options.

10. The system according to claim 9, wherein the processor is further configured to execute the instructions to:
receive, from the mobile device, a request message requesting access to the first set of vehicle control options and the second set of vehicle control options associated with a second level of user authentication.

11. The system according to claim 10, wherein the processor is further configured to execute the instructions to:
receive the authorization to trigger a secondary authentication request from a cloud-based server, wherein the authorization comprises an indication of an increased security need.

12. The system according to claim 9, wherein the authentication channel is a non-bonded communication channel.

13. The system according to claim 9, wherein the processor is further configured to execute the instructions to:
confirm that the mobile device is within an operational radius of the processor, and
determine that the mobile device may access the second set of vehicle control options responsive to determining that the mobile device is within the operational radius.

14. The system according to claim 9, wherein the processor is further configured to execute the instructions to:
send a request for additional user input to the mobile device, requesting additional mobile device user input to authenticate a user identity;
receive additional input responsive to the request for additional user input, and determining that the mobile device may access the second set of vehicle control options based on additional input; and
receive an encrypted token from the mobile device.

15. The system according to claim 14, wherein the processor is further configured to execute the instructions to:
receive the additional input from the user via an interface associated with the automotive computer of the vehicle.

16. The system according to claim 15, wherein the processor is further configured to execute the instructions to:
receive the additional input from the user.

17. The system according to claim 16, wherein the processor is further configured to execute the instructions to:
send the request for additional user input to the mobile device is responsive to determining that the mobile device is localized within the vehicle.

18. A non-transitory computer-readable storage medium in an automotive computer of a vehicle, the computer-readable storage medium having instructions stored thereupon which, when executed by a processor, cause the processor to:
establish, for a mobile device, an authentication channel providing control access to a first set of vehicle control options associated with a vehicle;
responsive to authentication of the first set of vehicle control options, receive an authorization to trigger a secondary authentication, via an authentication manager associated with the vehicle, that the mobile device may access a second set of vehicle control options;
determine, based on the authorization, and via the authentication manager associated with the vehicle, that the mobile device may access the second set of vehicle control options;
receive a secondary authentication; and provide, via the authentication manager, the second set of vehicle control options responsive to the secondary authentication, wherein authentication of the first set of vehicle control options comprises determining that the mobile device is associated with a first privilege level associated with the vehicle, and wherein authentication of the second set of vehicle control options comprises determining that the mobile device is associated with a second privilege level associated with the vehicle, wherein the second set of vehicle control options provide different control over the vehicle to the mobile device than the first set of vehicle control options.

19. The non-transitory computer-readable storage medium according to claim 18, having further instructions stored thereupon to:

receive, from the mobile device, a request message requesting access to the second set of vehicle control options associated with a second level of user authentication.

20. The non-transitory computer-readable storage medium according to claim 18, having further instructions stored thereupon to:

receive information that the authentication channel is a non-bonded communication channel.

21. The method of claim 1, wherein the vehicle is an autonomous vehicle, and wherein the second set of vehicle control options allow the mobile device to manually control the vehicle.

* * * * *